United States Patent [19]

Asano et al.

[11] Patent Number: 4,982,305

[45] Date of Patent: Jan. 1, 1991

[54] TAPE RECORDER WITH AUTOMATIC PAUSE MODE SETTING

[75] Inventors: Hisashi Asano; Masanori Kimizuka, both of Tokyo, Japan

[73] Assignee: Sony Corporation, Tokyo, Japan

[21] Appl. No.: 306,385

[22] Filed: Feb. 6, 1989

[30] Foreign Application Priority Data

Feb. 25, 1988 [JP] Japan .................................. 63-43184
Jun. 24, 1988 [JP] Japan ................................ 63-156211

[51] Int. Cl.⁵ ...................... G11B 27/28; G11B 15/06; G11B 23/36
[52] U.S. Cl. .................................... 360/72.2; 360/69; 360/73.12
[58] Field of Search ....................... 360/72.2, 69, 74.4, 360/74.1, 74.12

[56] References Cited

U.S. PATENT DOCUMENTS 4,688,116 8/1987 Takahashi et al. ................. 360/72.2

FOREIGN PATENT DOCUMENTS 0196216 10/1986 European Pat. Off. ........... 360/72.2
0197782 10/1986 European Pat. Off. ........... 360/72.2

Primary Examiner—Robert S. Tupper
Assistant Examiner—Alfonso Garcia
Attorney, Agent, or Firm—Lewis H. Eslinger; Jay H. Maioli

[57] ABSTRACT

In a recording apparatus having a digital signal input which can record such digital signal on a recording medium, when a condition of the input signal changes during the recording operation the recording apparatus is automatically set into a recording pause mode and such operating mode is indicated to the operator. When the condition of the input signal is stabilized within a predetermined period of time during such recording pause mode, the recording medium is automatically rewound and the recording apparatus is then released from the recording pause mode and recording commences at a location on the record medium so as to record over any previously recorded unstable signal.

8 Claims, 2 Drawing Sheets

TAPE RECORDER WITH AUTOMATIC PAUSE MODE SETTING

BACKGROUND OF THE INVENTION

1. Field of the Invention

This invention relates generally to recording apparatus and, more particularly, to a recording apparatus having a digital signal input for recording such input digital signal on a record medium.

2. Description of the Background

Digital tape recorders that use a rotary head to record an audio signal in the form of pulse code modulation (PCM) digital data on a magnetic tape are known. This kind of digital tape recorder is frequently called a rotary head-type digital audio tape recorder (R-DAT). In such R-DAT apparatus, a magnetic tape is obliquely wrapped around a small rotary drum of about 30 mm in diameter over an angular extent of 90°, for example. Two rotary heads having different azimuth angles are mounted on the rotary drum with an angular separation of about 180° between them. These two rotary heads are rotated at a rate of 2000 r.p.m., for example, and the two rotary heads alternately scan the width of the magnetic tape by an amount corresponding to the tape wrapping angle of 90°. Typically, the audio signal is sampled at a sampling frequency of 48kHz and each sampled value is processed in the so-called 16-bit linear quantization manner, thereby producing the PCM data. The PCM data is time-compressed by a time-compressing ratio based upon the tape wrap angle of 90° at every ½ rotation period of the rotary head and is subsequently recorded on the magnetic tape by the rotary heads as a series of adjacent slanted tracks.

Upon playback, the PCM data is reproduced from the magnetic tape by the two rotary heads and is decoded, time-expanded, and then reconverted into an analog audio signal. In this kind of digital recorder, in addition to the PCM data, sub-codes such as a time code, a program number, a start identifying signal or the like are also recorded on each track in specified regions different than those where the PCM data is recorded. Generally, a switch is provided that permits the user to switch input sources, for example, between an analog audio signal and a digital signal, such as from a broadcast satellite or the like. The selected input signal is then apportioned between the two rotating heads and recorded in slant tracks on the tape. Upon playback, the signals reproduced by the rotary heads are amplified and passed through a switching circuit before being fed through an error correction circuit to a digital-to-analog convertor. The output from the error correction circuit is typically employed to detect the sub-code information, which is used to control a micro-computer included in the recording apparatus. In such digital recorders, if the digital audio signal at the input changes either by being interrupted or by having an altered sampling rate, the recorder continues in the recording mode and results in an unstable signal being recorded on the magnetic medium. Such unstable signal is undesirable and produces annoying clicks and the like during playback.

OBJECTS AND SUMMARY OF THE INVENTION

Accordingly, it is an object of the present invention to provide a method and apparatus for recording a signal that can eliminate the above-noted defects inherent in the prior art.

Another object of this invention is to provide a recording apparatus that can produce excellent recordings even when the condition of the digital signals supplied to the input terminal changes.

A further object of this invention is to provide a recording apparatus that can avoid an undesired, unstable signal from being recorded on the recording medium.

A still further object of this invention is to provide a recording apparatus that can indicate to the user that the recording apparatus has been automatically set into a recording pause mode.

Still another object of the invention is to provide a recording apparatus that can prevent the user from being ill at ease and overly concerned when a recording pause mode continues for what may seem to be a long period of time.

In accordance with one aspect of the present invention, there is provided a recording apparatus that has an input terminal for receiving a digital signal, a recording mechanism for recording the digital input signal onto a record medium and which includes a detector that detects whether the condition of the digital input signal has changed, and a mode setting system for setting the apparatus into various operating modes including the recording mode, a pause mode, and a recording stop mode. A system is provided for operating a recording mode setting mechanism so that the recording apparatus is set in the recording mode and for operating a pause mode setting mechanism to set the recording apparatus into the pause mode when the detecting means detects that the condition of the input digital signal has changed while the recording apparatus has been in the recording mode. A system is provided to release the pause mode setting mechanism when the detecting means detects that the input condition of the digital input has remained steady for a predetermined period of time while the apparatus is in the pause mode and thereby operates the recording mode setting mechanism to set the recording mode back into a recording mode. The invention then provides a means for releasing the pause mode setting mechanism when the detector detects that the input condition has changed within a predetermined time while in the pause mode and setting the recording apparatus into the stop mode.

The above and other objects, features and advantages of the present invention will become apparent from the following detailed description of illustrative embodiments thereof to be read in conjunction with the accompanying drawings, in which like reference numerals identify the same or similar elements.

DETAILED DESCRIPTION OF PREFERRED EMBODIMENTS

Figure 1:
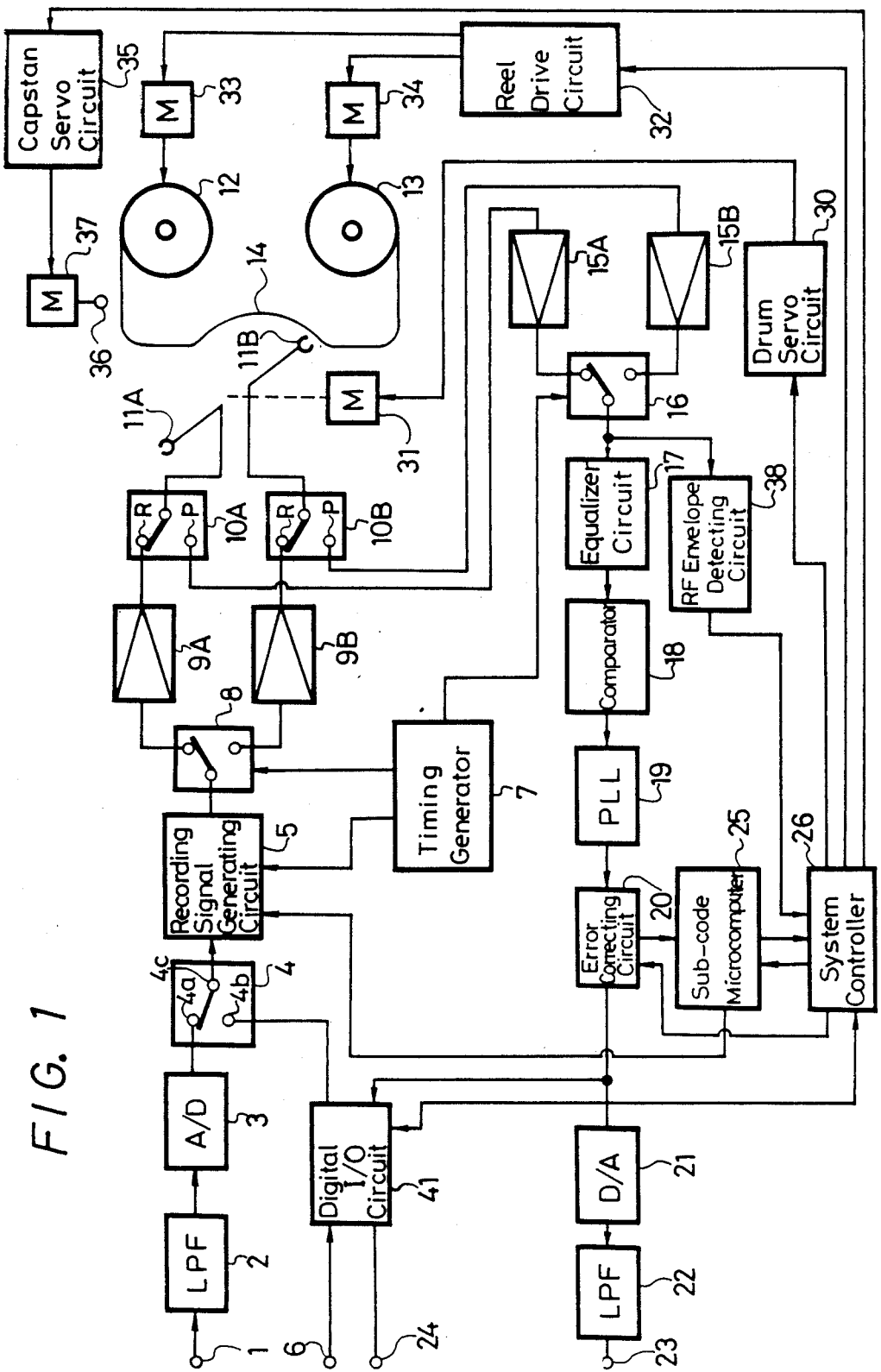
FIG. 1 is a schematic in block diagram form of an R-DAT recording apparatus embodying the present invention.

The embodiment of the present invention described herein-below is applied to a R-DAT recording apparatus as shown for example in FIG. 1. This R-DAT recording apparatus is operated in accordance with the flow chart of FIG. 2. In FIG. 1, an analog audio signal fed to input terminal 1 is supplied through a low pass filter 2 and through an analog-to-digital convertor 3 (A/D), where it is converted into a digital audio signal using a sampling frequency of 48 kHz and the so-called 16-bit linear quantization method The output of the A/D convertor 3 is fed to a fixed terminal 4a of switch 4, whose output in turn is fed to an input of a recording signal generating circuit 5. In the event that an original digital signal is available for recording, such digital signal is fed in at input terminal 6 to a digital I/O circuit 41 and as an output therefrom to another fixed terminal 4b of switch 4. Accordingly, upon operation of switch 4, either the digitally converted analog audio signal fed in at terminal 1 or the original digital signal, which might be provided from a tuner for satellite broadcasts or from another R-DAT recording apparatus, fed in at terminal 6 is connected to recording signal generating circuit 5.

The timing of recording signal generating circuit 5 is controlled by a signal from a timing generator 7 so that the recording signal generating circuit 5 can perform the necessary signal processing operations such as the addition of an error correcting code, data interleaving, modulation, and the like. Accordingly, the output of recording signal generating circuit 5 is a serial recording data signal corresponding to one track and is fed to an input terminal of switching circuit 8. Switching circuit 8 is adapted in the well-known fashion to switch the input signal between rotary heads 11A and 11B so that the switch 8 is alternately changed in position during each respective ½ rotation period that corresponds to the tape contact period of rotary head 11A and of rotary head 11B, in response to a switching signal from timing generating circuit 7. This switching signal from timing generator 7 is preferably produced in response to pulses indicating the rotary phase of rotary heads 11A and 11B from a pulse generator, not shown.

The digital recording data from switching circuit 8 is fed through recording amplifiers 9A and 9B and then supplied through fixed contacts R of switching circuits 10A and 10B to rotary heads 11A and 11B, respectively, which record the data on a magnetic tape as slanted tracks. The magnetic tape 14 is shown in FIG. 1 as being wound between take-up and supply reels 12 and 13, respectively.

Upon playback, signals reproduced from magnetic tape 14 by rotary heads 11A and 11B are fed through fixed contacts P of switches 10A and 10B, respectively, to playback amplifiers 15A and 15B. The outputs of playback amplifiers 15A and 15B are fed to the fixed contacts of a switch 16, which is under control of switching signals from the timing generator circuit 7 to alternately change the switch connection during each ½ rotation period that includes the tape contacts periods of rotary heads 11A and 11B.

The output of switching circuit 16 is fed through an equalizer circuit 17, a comparator circuit 18, and a phase-locked loop circuit (PLL) 19 to an error correcting circuit 20. In the error correcting circuit 20 any errors that may be present and that can be corrected by the earlier provided error correction codes and parity symbols are corrected. The equalizer 17, comparator 18, and PLL circuit 19 comprise the so-called electromagnetic transducing system, as known heretofore. The output of error correction circuit 20 is fed to a digital-to-analog convertor (D/A) 21 and converted into an analog signal that is then passed through a low-pass filter (LPF) 22 and made available at an output terminal 23. This signal at terminal 23 then in the appropriate circumstances is the original analog audio signal that can be fed to a suitable playback transducer of the audio system.

The output signal from error correcting circuit 20 is also fed into the digital I/O circuit 41 and also made available as a digital output at digital output terminal 24. In addition, the digital output from error correcting circuit 20 is also fed to a sub-code microcomputer 25 that operates as an interface to extract the sub-code signal that typically includes the timing code, the program number, the start ID signal and the like.

The operation of the entire recording apparatus may be controlled by a system controller 26 that would include a number of operational control buttons or switches, such as the play control, the stop button, and the like that although not shown are necessary for operation of the recording apparatus. Accordingly, the system controller 26 is seen to provide suitable control signals to digital I/O circuit 41 and error correcting circuit 20, for example. During recording, digital data at the sampling frequency is fed through digital I/O circuit 41 that operates to detect any change in sampling frequency Fs that might occur in the incoming digital audio signal fed into input terminal 6. The result of this detection of any change in the sampling frequency Fs is fed to system controller 26. In the event that a change in the sampling frequency Fs of the incoming digital audio signal is detected by digital I/O circuit 41, data of various sampling frequencies are sequentially supplied from the system controller 26 to the digital I/O circuit 41, which detects the sampling frequency Fs of the incoming digital audio signal, thereby changing a circuit constant or the like to accommodate for this change in sampling frequency. For example, the sampling frequency of the incoming digital audio signal from a broadcast satellite tuner may have a sampling frequency of 32 kHz, 44 kHz, or 48 kHz and it is data concerning these different frequencies that is provided to I/O circuit 41 by system controller 26.

System controller 26 also provides an input signal to a drum servo circuit 30 that controls a drum motor 31 that rotates the rotary drum (not shown) on which rotary heads 11A and 11B are mounted. System controller 26 also provides a control signal to a reel drive circuit 32 that provides drive signals to the reel drive motors 33 and 34 that operate take-up and supply reels 12 and 13, respectively. System controller 26 provides a mode (play, fast forward, reverse) switching signal to reel drive circuit 32, so that the level of the drive signals supplied to reel motors 33 and 34 can be changed accordingly. Similarly, system controller 26 provides a control signal to a capstan servo circuit 35 that operates to control a capstan motor 37 that rotates a tape drive capstan, shown schematically at 36. Of course, also provided but not shown are a pinch roller for capstan 36, and a plunger circuit for controlling the operation of the pinch roller against capstan 36. System controller 26 receives as an input signal, in additional to the information from the digital I/O circuit 41, a signal from an RF envelope detecting circuit 38 that has as an input the reproduced digital signal from switching circuit 16.

As pointed out hereinabove, one problem present in the R-DAT recording apparatus is that during the recording operation if the digital signal being fed in at digital input terminal 6 changes, either the sampling frequency Fs changes or the digital signal is interrupted, the recording operation continuous regardless. It is this situation that produces the undesired signals, such as clicks or pops and the like, that are recorded on magnetic tape 14.

Figure 2:
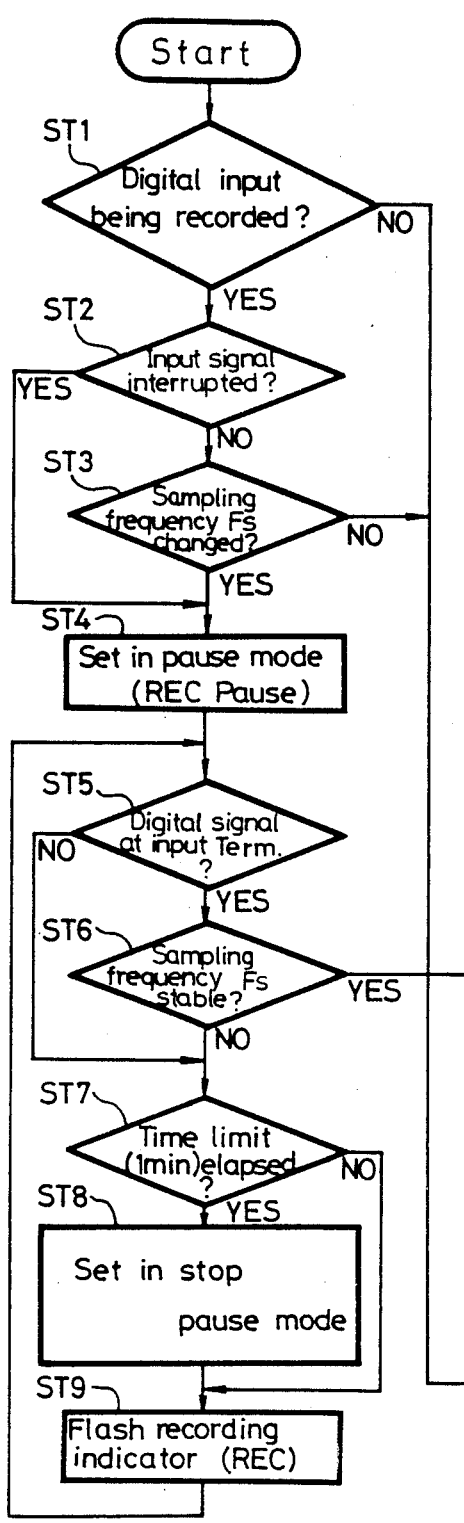
FIG. 2 is a flow chart useful in explaining the operation of the present invention.

Upon operating the apparatus of FIG. 1 in correspondence with the procedure shown in FIG. 2, this undesirable recording situation can be alleviated. Turning then to the flow chart of FIG. 2, following the Start of the operation, it is initially determined at decisional step ST1 whether the digital audio signal fed in at input terminal 6 is being recorded. If such digital input signal at terminal 6 is not being recorded then the routine simply exits to a Return to the main program command located at the end of this sub-routine.

On the other hand, if it is determined at step ST1 that the digital input signal at terminal 6 is being recorded, then the program proceeds to the next decisional step ST2 where it is determined whether the supply of the digital audio signal at digital input terminal 6 is being interrupted or not. In this operation, the digital I/O circuit 41 detects the presence or absence of the input audio signal and the results of that detection are supplied to the system controller 26 that carries out the above decision. For example, it is determined that the supply of digital audio signal at input terminal 6 is continuous and not interrupted, as represented by a NO in decisional step ST2, the sub-routine goes to the next decisional step ST3. At step ST3 determination is made whether the sampling frequency Fs of the digital audio input signal fed at input terminal 6 is undergoing change. As noted hereinabove, in the embodiment of FIG. 1 data representing the current sampling frequency is supplied from system controller 26 to digital I/O circuit 41 where it is compared with the sampling frequency Fs. Thus, any change of sampling frequency Fs is detected at digital I/O circuit 41 and the results thereof are fed to and judged by system controller 26. On the other hand, if it is determined that sampling frequency Fs of the digital audio signal is not changed, a NO is output at step ST3 and the sub-routine returns to the main operating program.

If it is determined that the sampling frequency has changed then the sub-routine moves to step ST4 where the R-DAT recording apparatus is set into the pause mode, represented as REC pause. This pause mode is also selected if it is determined in step ST2 that the input signal is interrupted, so that either a sampling frequency change or signal interruption results in the setting of the R-DAT into the recording pause mode at step ST4.

While the recording apparatus is set into the pause mode in step ST4, the next decision is made at step ST5 as to whether the digital audio signal is being supplied to input terminal 6. If so, the sub-routine moves to decisional step ST6 where it is determined whether the sampling frequency of the digital audio signal has stabalized. Of course, such stabilization can be easily determined by simply detecting the sampling frequency Fs. As pointed out above, in this case, data representing the various sampling frequency values can be sequentially fed from system controller 26 to digital I/O circuit 41, wherein such data can be compared to the actual sampling frequency Fs of the signal being received at input terminal 6. Sampling frequency Fs is then detected by digital I/O circuit 41 and the detection results fed to and judged by system controller 26. If it is determined that sampling frequency Fs has not stabilized a NO is output from step ST6 and fed to the next decision ST7 where it is determined whether a predetermined period of time, for example, one minute, has passed after the initial R-DAT setting into the pause mode as that occured in step ST4. If at step ST7 it is determined that a minute has elapsed from the time that the R-DAT apparatus is set into the pause mode, then a YES is produced at step ST7 and the sub-routine moves to ST8 where the R-DAT apparatus is set into the stop pause mode.

In the stop pause mode, rotation of the rotary drum on which heads 11A and 11B are mounted and rotation of the capstan 36 are stopped and the mechanical elements of the R-DAT recording apparatus are released from the pause mode and set into the stop mode. Upon having set the mechanism into the stop pause mode, the sub-routine moves to step ST9 that serves to command the light emitting diode that serves as the recording indicator to flash and then the sub-routine returns to the step ST5.

On the other hand, if in step ST7 it is determined that the time limit has not elapsed, as represented by a NO, the program then moves back to step ST5 after passing through the step ST9 whereat the recording indicator is caused to flash. Accordingly, it is seen that when the digital audio signal is not supplied at input terminal 6 or when the sampling frequency is not stable even though the audio signal is being supplied, the recording indicator is caused to flash at step ST9, thereby indicating that the R-DAT recording apparatus is set into the recording pause mode.

Figure 3A:
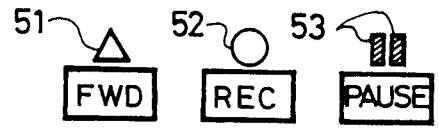
FIGS. 3A and 3B are pictorial representations of respective modes of operational indicators of the R-DAT recording apparatus.
Figure 3B:
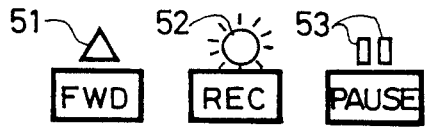
Figure 3B:
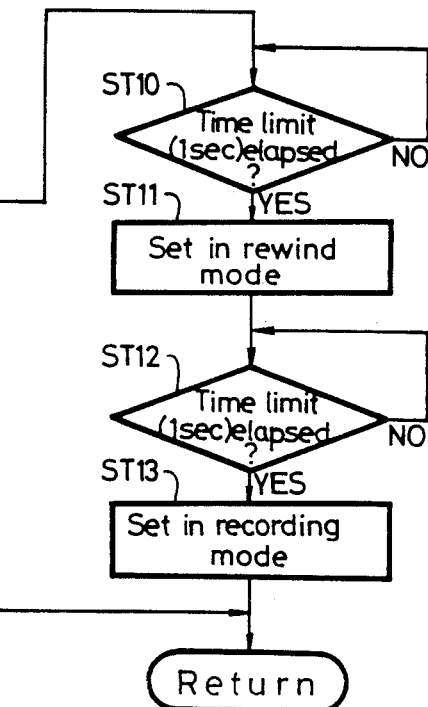

Such recording pause mode is pictorially represented in FIG. 3B, which represents a first light emitting diode 51 that indicates the forward running mode, a second light emitting diode 52 that indicates the recording mode, and a third light emitting diode 53 that indicates the pause mode of the R-DAT. FIG. 3B is intended to represent that light emitting diodes 51 and 53 are energized or illuminated, while light emitting diode 52 is caused to flash. On the other hand, FIG. 3A illustrates that the R-DAT is set into the recording mode in which light emitting diodes 51 and 52 are turned on, while light emitting diode 53 representing pause is turned off.

If it is determined in step ST6 that sampling frequency Fs is stable then the next decisional step ST10 is performed whereat it is determined whether one second has passed since the time the sampling frequency was stabilized. If it is determined in step ST10 that the sampling frequency is not stable for a period of one second, then this step is repeated continuously. It is noted that when the sampling frequency Fs of the digital audio signal fed in at input terminal 6 is being changed, the necessary switching of the circuit constant and the like will be carried out within a time period of one second.

On the other hand, if it is determined in step ST10 that the sampling frequency Fs is stabilized, the sub-routine moves to step ST11 at which the R-DAT recording apparatus is set into the reverse or rewind mode. Upon setting the R-DAT recording apparatus into the rewind mode, it is then determined in step ST12 whether one second has elapsed. If not, this time check is executed continuously.

The provision of setting the R-DAT apparatus into the rewind mode at step ST11 is performed to erase by an overwriting operation an undesired or unstable signal that was recorded on magnetic tape 14 while the R-DAT apparatus was set in the pause mode when the supplying of the digital audio signal at input terminal 6 was interrupted or when the sampling frequency Fs was changed. The duration of the time period in step ST12 is not limited to one second but may be longer than the time in which the undesired or unstable signal was recorded. If if it determined that one second has passed after the R-DAT recording apparatus was set into the rewind mode, as represented by a YES at step ST12, the sub-routine procedes to step ST13 where the R-DAT is set into the recording mode and the sub-routine returns to the main program.

According to this embodiment of the present invention, if any change in the digital input signal at input terminal 6 takes place, either by the supply of the signal being interrupted or by the sampling frequency Fs being changed, the R-DAT recording apparatus is quickly set into the pause mode. If the supply of the digital audio signal to input terminal 6 has not stabilized within one minute after the setting into this pause mode, the recording apparatus is set into the stop pause mode. In the pause mode, as well as in the stop pause mode, a light emitting diode 52 is caused to flash indicating that the recording apparatus remains set in the recording pause mode. While in the recording pause mode when the digital input signal at terminal 6 becomes stabilized the recording apparatus is set in the rewind mode for one second and after one second has passed the recording apparatus is then returned to the recording mode.

Thus, as seen from the above, when the condition of the audio signal being supplied at input terminal 6 changes the recording apparatus is placed into a pause mode and then into a stop pause mode so that after the input digital signal becomes stabilized, magnetic tape 14 is then rewound by a tape length corresponding to the duration of time during which the undesired or unstable signal was recorded and then recording is commenced again. Therefore, even when the supply of the digital input signal changes any undesirable or unstable signal is prevented from being recorded and an excellent recording is produced.

Of course, as seen in the above, when the supply of the digital audio signal to input terminal 6 does not stabilize within one minute after the recording apparatus has been set into the pause mode, then the apparatus is set into the stop pause mode thereby preventing the magnetic tape from being damaged. Further, because light emitting diode 52 flashes to indicate that the apparatus is set into the recording pause mode, such as the pause mode or the stop pause mode, there is a positive indication to the user that there should be no concern about the existence of a long recording pause mode.

In the system of FIG. 2, steps ST7 and ST8 are provided in order to protect magnetic tape 14 from being damaged and, thus, are not always required. In addition, the time limit of one minute in ST7 may be selected based upon individual system requirements.

Furthermore, although light emitting diode 52 is adapted to flash to indicate that the recording apparatus has been set in the recording pause mode, all of the light emitting diodes 51, 52, and 53, could be made to flash. In addition, an individual indicating element could also be provided.

While the above embodiment is directed to a R-DAT recording apparatus using a tape, the present invention could be similarly applied to any recording apparatus employing a disc, semiconductor memory, or the like as the recording medium.

It should be understood that the above is presented by way of example only and many modifications and variations could be effected by one skilled in the art without departing form the spirit or scope of the novel concepts of the invention, which should be determined by the appended claims.

What is claimed is:

1. A recording apparatus comprising:
   (a) an input terminal supplied with a digital signal;
   (b) recording means for recording on a recording medium the digital signal supplied to said input terminal;
   (c) detecting means for detecting whether a sampling frequency of the digital signal at said input terminal has changed;
   (d) recording mode setting means for setting said recording means into a recording mode;
   (e) pause mode setting means for setting said recording means into a recording pause mode;
   (f) stop mode setting means for setting said recording means into a recording stop mode;
   (g) means for controlling said recording mode setting means to set said recording means in said recording mode and for controlling said pause mode setting means to set said recording means in said recording pause mode when said detecting means detects that the sampling frequency of said digital signal has changed during recording of said digital signal by said recording means;
   (h) means for releasing the operation of said pause mode setting means when said detecting means detects that the sampling frequency of said digital signal has not changed within a predetermined time while in said pause mode and for operating said recording mode setting means to set said recording means into said recording mode; and
   (i) means for releasing the operation of said pause mode setting means when said detecting means detects that the sampling frequency of said digital signal has changed within a predetermined time while in said pause mode and for setting said recording means in said recording stop mode.

2. A recording apparatus according to claim 1, further comprising lamp means connected to flash on and off in response to said means for controlling said pause mode setting means for visually indicating to an operator of the recording apparatus that said recording means is set into said recording pause mode.

3. A recording apparatus according to claim 1, further comprising means for detecting a position on said recording medium at which said pause mode setting means is operated and for rewinding said recording medium to the position at which said pause mode setting means was set by operation of said pause mode setting means when said detecting means detected that the sampling frequency of said digital signal had not changed within a predetermined time while in said pause mode and for operating said recording mode setting means to set said recording means in said recording mode.

4. A recording apparatus according to claim 1, in which said recording medium is a magnetic tape.

5. A recording apparatus according to claim 1, in which said recording means includes means for recording a signal on said recording medium in the form of a digital signal.

6. A method of operating a recording apparatus supplied with a digital signal, comprising the steps of:
   setting a recording system of the apparatus into a recording mode for recording the digital signal;

recording with the recording system on a recording medium the supplied digital signal;

detecting whether a sampling frequency of the supplied digital signal changes during the recording mode;

setting the recording system in a recording pause mode upon detecting that the sampling frequency of the digital signal changed during recording of said digital signal in the recording mode;

releasing operation of the pause mode when detecting that the sampling frequency of the digital signal has not changed within a predetermined time while set in the pause mode and setting the recording system in the recording mode; and releasing the operation of the pause mode when detecting that the sampling frequency of the digital signal changes within a predetermined time in the pause mode and setting the recording system in a recording stop mode.

7. A method of operating a recording apparatus according to claim 6, further comprising providing a lamp for flashing on and off in response to setting the recording system in the recording pause mode for visually indicating to an operator of the recording apparatus the setting of the recording pause mode.

8. A method of operating a recording apparatus according to claim 6, further comprising;

determining a position on said recording medium at which said pause mode is set and rewinding the recording medium to the position at which the pause mode was set and setting the recording system in the recording mode.

* * * * *